(12) United States Patent
Sun et al.

(10) Patent No.: US 10,608,988 B2
(45) Date of Patent: Mar. 31, 2020

(54) METHOD AND APPARATUS FOR BLUETOOTH-BASED IDENTITY RECOGNITION

(71) Applicant: Beijing Xiaomi Mobile Software Co., Ltd., Beijing (CN)

(72) Inventors: Yongli Sun, Beijing (CN); Weiguang Jia, Beijing (CN); Enxing Hou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 260 days.

(21) Appl. No.: 15/659,957

(22) Filed: Jul. 26, 2017

(65) Prior Publication Data
US 2018/0034772 A1 Feb. 1, 2018

(30) Foreign Application Priority Data
Jul. 29, 2016 (CN) .......................... 2016 1 0617941

(51) Int. Cl.
*G06F 15/16* (2006.01)
*H04L 29/12* (2006.01)
(Continued)

(52) U.S. Cl.
CPC ............ *H04L 61/30* (2013.01); *H04L 63/101* (2013.01); *H04W 4/80* (2018.02); *H04W 8/20* (2013.01);
(Continued)

(58) Field of Classification Search
CPC ....... H04L 61/30; H04L 61/15; H04L 63/101; H04L 63/0853; H04W 4/80
(Continued)

(56) References Cited

U.S. PATENT DOCUMENTS 8,170,480 B1 5/2012 Kammer
9,401,905 B1 * 7/2016 Kowalski ............ H04L 63/0853
(Continued)

FOREIGN PATENT DOCUMENTS

CN 102025655 A 4/2011
CN 104486296 A 4/2015
(Continued)

OTHER PUBLICATIONS

Extended Search Report for European Application No. 17152470.5 from the European Patent Office, dated Jul. 18, 2017.
(Continued)

*Primary Examiner* — Bharat Barot
(74) *Attorney, Agent, or Firm* — Finnegan, Henderson, Farabow, Garrett & Dunner, L.L.P.

(57) ABSTRACT

A method for a smart device to perform Bluetooth (BT)-based identity recognition, includes: establishing a BT connection with a first terminal; acquiring a first user account of the first terminal through the BT connection; searching a first preset mapping table for a first identifier (ID) corresponding to the first user account, the first mapping table including a first mapping relationship between at least one user account and at least one ID, each ID corresponding to a respective user account, and the first mapping relationship being determined and sent to the smart device by a server; and determining a user identity corresponding to the first terminal according to the first ID.

17 Claims, 7 Drawing Sheets

(51) Int. Cl.
  *H04W 4/80* (2018.01)
  *H04W 12/08* (2009.01)
  *H04L 29/06* (2006.01)
  *H04W 8/20* (2009.01)
  *H04W 12/06* (2009.01)
  *H04W 84/12* (2009.01)
  *H04W 8/22* (2009.01)

(52) U.S. Cl.
  CPC ............. *H04W 12/08* (2013.01); *H04L 61/15* (2013.01); *H04L 63/0853* (2013.01); *H04W 8/22* (2013.01); *H04W 12/06* (2013.01); *H04W 84/12* (2013.01)

(58) Field of Classification Search
  USPC .................................. 709/245–246, 227–228
  See application file for complete search history.

(56) References Cited

U.S. PATENT DOCUMENTS

| | | | | |
|---|---|---|---|---|
| 2010/0279613 | A1* | 11/2010 | Li | H04W 8/26 455/41.3 |
| 2012/0238216 | A1* | 9/2012 | Hallowell | H04W 84/18 455/41.3 |
| 2013/0057897 | A1 | 3/2013 | Park et al. | |
| 2015/0264091 | A1* | 9/2015 | Lin | H04L 67/12 709/228 |
| 2015/0350905 | A1 | 12/2015 | Suzuki | |
| 2016/0150350 | A1* | 5/2016 | Ingale | H04W 12/08 370/255 |
| 2017/0257475 | A1* | 9/2017 | Zong | H04W 12/06 |

FOREIGN PATENT DOCUMENTS

| | | |
|---|---|---|
| CN | 104507034 A | 4/2015 |
| CN | 104780155 A | 7/2015 |
| CN | 105322986 A | 2/2016 |
| EP | 2 566 206 A1 | 3/2013 |
| EP | 2 950 560 A1 | 12/2015 |

OTHER PUBLICATIONS

"How Linux Works CTDP Guide Version 0.6.0 Jun. 1, 2000—Login Process", Jun. 1, 2000 (Jun. 1, 2000), retrieved Jul. 6, 2017 from http://www comptechdoc.org/os/linux/howlinuxworks/linux_hllogin.

"Practical Unix and Internet Security—4.4 Network Account and Authorization Systems", Dec. 5, 2008 (Dec. 5, 2008), retrieved Jul. 6, 2017 from https://web.archive.org/web/20081205053850/http://etutorials.org/Linux+systems/unix+internet+security/Part+II+Security+Building+Blocks/Chapter+4.+Users+Passwords+and+Authentication/4.4+Network+Account+and+Authorization+Systems/.

"Bluetooth Basics—learn.sparkfun.com," Oct. 18, 2015 (Oct. 18, 2015), retrieved Jul. 6, 2017 from https://web.archive.org/web/20151018112633/https://learn.sparkfun.com/tutorials/bluetooth-basics/all.

Chinese Office Action dated Jan. 2, 2019, in counterpart Chinese Application No. 201610617941.9.

* cited by examiner

METHOD AND APPARATUS FOR BLUETOOTH-BASED IDENTITY RECOGNITION

CROSS-REFERENCE TO RELATED APPLICATIONS

This application is based upon and claims priority to Chinese Patent Application No. 201610617941.9, filed on Jul. 29, 2016, the entire content of which is incorporated herein by reference.

TECHNICAL FIELD

The present disclosure generally relates to the technical field of network security, and more particularly, to a method and apparatus for Bluetooth (BT)-based identity recognition.

BACKGROUND

During BT communications between terminals, it is necessary to determine user identities of the opposite ends to determine whether a communication process is secure.

In a related conventional technology, a first terminal establishes a BT connection with a second terminal. The first terminal sends user identity recognition information to the second terminal, and the second terminal identifies whether a user identity of the first terminal is legal according to the recognition information. If the user identity of the first terminal is legal, the second terminal communicates with the first terminal through the BT connection.

A Wireless Fidelity (WiFi)-based identity recognition method is also provided in the related conventional technology. A server determines a relationship between a terminal and a smart device, and establishes a first mapping table including a mapping relationship between a user account of the terminal and an identifier (ID). The terminal establishes a WiFi connection with the smart device. The smart device acquires a user account of the terminal, and sends the user account to the server. The server searches the first mapping table for an ID corresponding to the user account, and sends the found ID to the smart device. The smart device determines the ID as a user identity corresponding to the terminal.

In such an implementation, however, the smart device is required to remain a network connection with the server during identity recognition of the terminal. When the smart device may not remain the network connection with the server, identity recognition of the terminal may not be executed. As a result, communication between the smart device and the terminal may be insecure. In addition, more time is consumed when the smart device determines the ID of the terminal through the server, which may cause a lower identity recognition efficiency.

The method and apparatus of the present disclosure are directed towards overcoming one or more the problems set forth above.

SUMMARY

According to a first aspect of the present disclosure, there is provided a method for a smart device to perform Bluetooth (BT)-based identity recognition, comprising: establishing a BT connection with a first terminal; acquiring a first user account of the first terminal through the BT connection; searching a first preset mapping table for a first identifier (ID) corresponding to the first user account, the first preset mapping table including a first mapping relationship between at least one user account and at least one ID, each ID corresponding to a respective user account, and the first mapping relationship being determined and sent to the smart device by a server; and determining a user identity corresponding to the first terminal according to the first ID.

According to a second aspect of the present disclosure, there is provided a BT-based identity recognition apparatus for use in a smart device, comprising: a processor; and a memory configured to store instructions executable by the processor. The processor is configured to: establish a BT connection with a first terminal; acquire a first user account of the first terminal through the BT connection; search a first preset mapping table for a first identifier (ID) corresponding to the first user account, the first preset mapping table including a first mapping relationship between at least one user account and at least one ID, each ID corresponding to a respective user account, and the first mapping relationship being determined and sent to the smart device by a server; and determine a user identity corresponding to the first terminal according to the first ID.

According to a third aspect of the present disclosure, there is provided a non-transitory computer-readable storage medium having stored therein instructions that, when executed by a processor of a smart device, cause the smart device to perform a BT-based identity recognition method, the method comprising: establishing a BT connection with a first terminal; acquiring a first user account of the first terminal through the BT connection; searching a first preset mapping table for a first identifier (ID) corresponding to the first user account, the first preset mapping table including a first mapping relationship between at least one user account and at least one ID, each ID corresponding to a respective user account, and the first mapping relationship being determined and sent to the smart device by a server; and determining a user identity corresponding to the first terminal according to the first ID.

It is to be understood that both the foregoing general descriptions and following detailed descriptions are exemplary and explanatory only and are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the specification, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely exemplary apparatuses and methods consistent with some aspects related to the present disclosure as recited in the appended claims.

Figure 1:
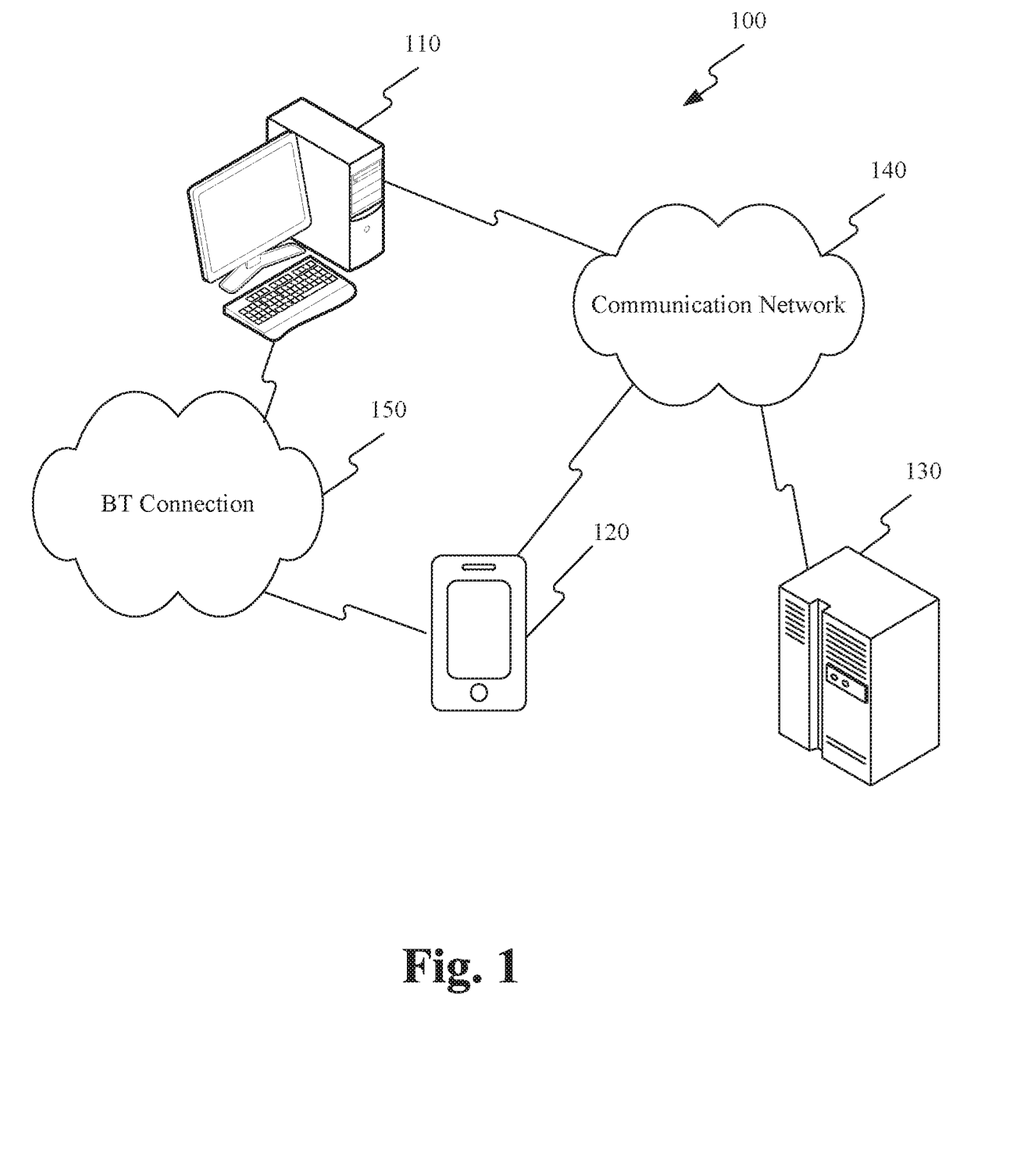
FIG. 1 is a schematic diagram illustrating an implementation environment for exemplary embodiments of the present disclosure.

FIG. 1 is a schematic diagram illustrating an implementation environment 100 for exemplary embodiments of the present disclosure. The implementation environment 100 may include a terminal 110, a BT-enabled smart device 120, and a server 130. The terminal 110 establishes a communication connection with the server 130 through a communication network 140. The communication network 140 may be a wired network or a wireless network. The terminal 110 establishes a communication connection 150 with the smart device 120 through a BT connection.

The terminal 110 may be any electronic equipment capable of establishing a BT connection, such as a mobile phone, a tablet computer, a portable laptop computer or a desktop computer.

The server 130 may be a computer server, a server cluster including a plurality of computer servers, or a cloud computing serving center.

In the exemplary embodiment, the server 130 determines a relationship between the terminal 110 and the smart device 120, generates a first mapping table including a mapping relationship between a user account of the terminal 110 and an ID, and sends the mapping relationship to the smart device 120. Then, the terminal 110 establishes the BT connection 150 with the smart device 120. The smart device 120 acquires the user account of the terminal 110, and searches the first mapping table for the ID corresponding to the user account, and determines the ID as a user identity corresponding to the terminal 110.

In the exemplary embodiment, the server 130 sends to the smart device 120 in advance the mapping relationship between the user account of the terminal 110 and the ID, such that the smart device 120 may perform identity recognition on the terminal 110 even when it does not remain the network connection 140 with the server 130. In addition, less time is consumed by a process that the smart device 120 locally determines the ID of the terminal 110, such that identity recognition efficiency can be improved.

Figure 2:
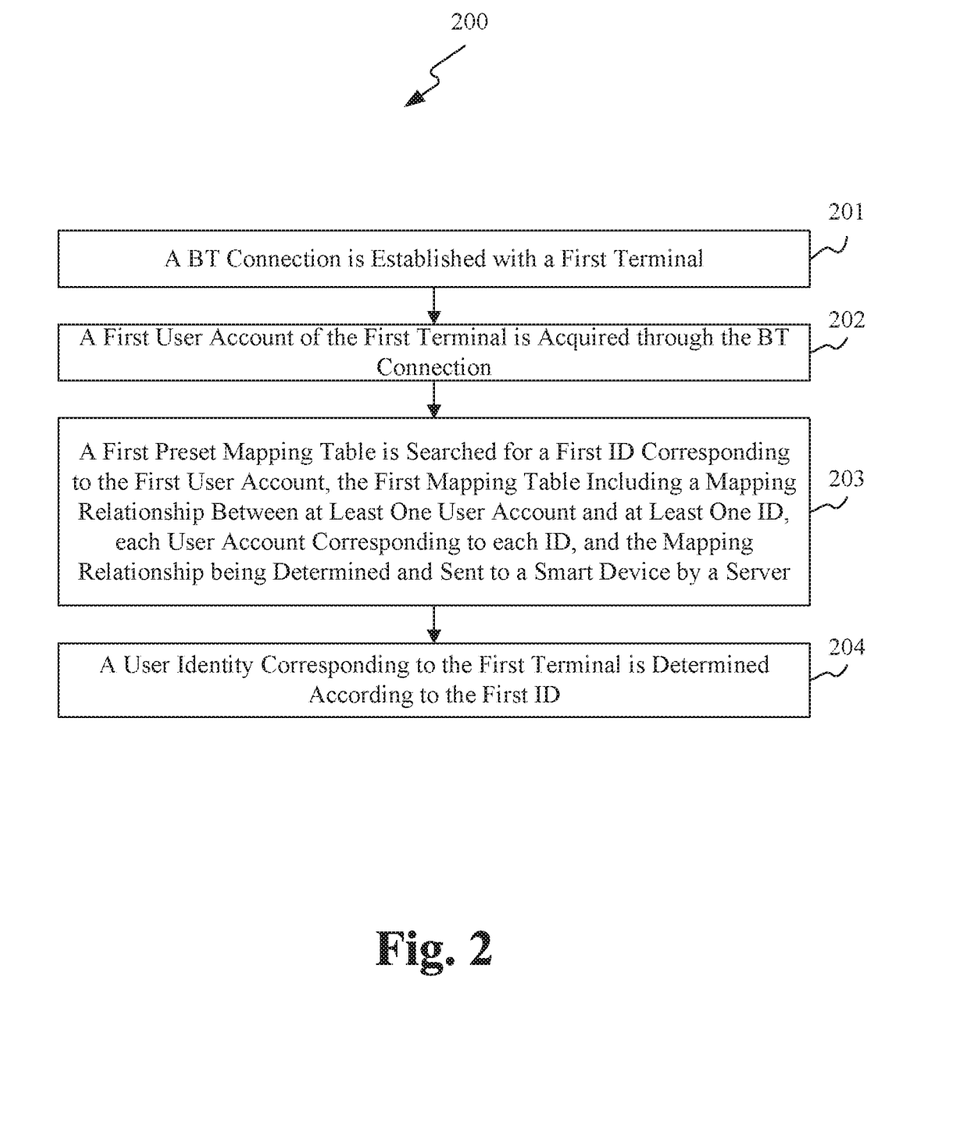
FIG. 2 is a flow chart of a method for BT-based identity recognition, according to an exemplary embodiment.

FIG. 2 is a flow chart of a method 200 for BT-based identity recognition, according to an exemplary embodiment. The method 200 may be applied to the implementation environment 100 in FIG. 1, and may include the following steps.

In step 201, a BT connection is established with a first terminal.

In step 202, a first user account of the first terminal is acquired through the BT connection.

In step 203, a first preset mapping table is searched for a first ID corresponding to the first user account. The first preset mapping table includes a mapping relationship between at least one user account and at least one ID. Each ID corresponds to a respective user account, and the mapping relationship is determined and sent to a smart device by a server.

In step 204, a user identity corresponding to the first terminal is determined according to the first ID.

In the method 200, the first user account of the first terminal is acquired through the BT connection established with the first terminal, and the first preset mapping table is searched for the first ID corresponding to the first user account. The first mapping table includes the mapping relationship between the at least one user account and the ID corresponding to each user account. The mapping relationship is determined and sent to the smart device by the server. The user identity corresponding to the first terminal is determined according to the first ID. In this way, the smart device communicates with the terminal after recognizing the user identity of the terminal, such that the problem of communication insecurity caused by communications between an illegal terminal and the smart device is solved, and the effect of ensuring communication security is achieved.

Figure 3:
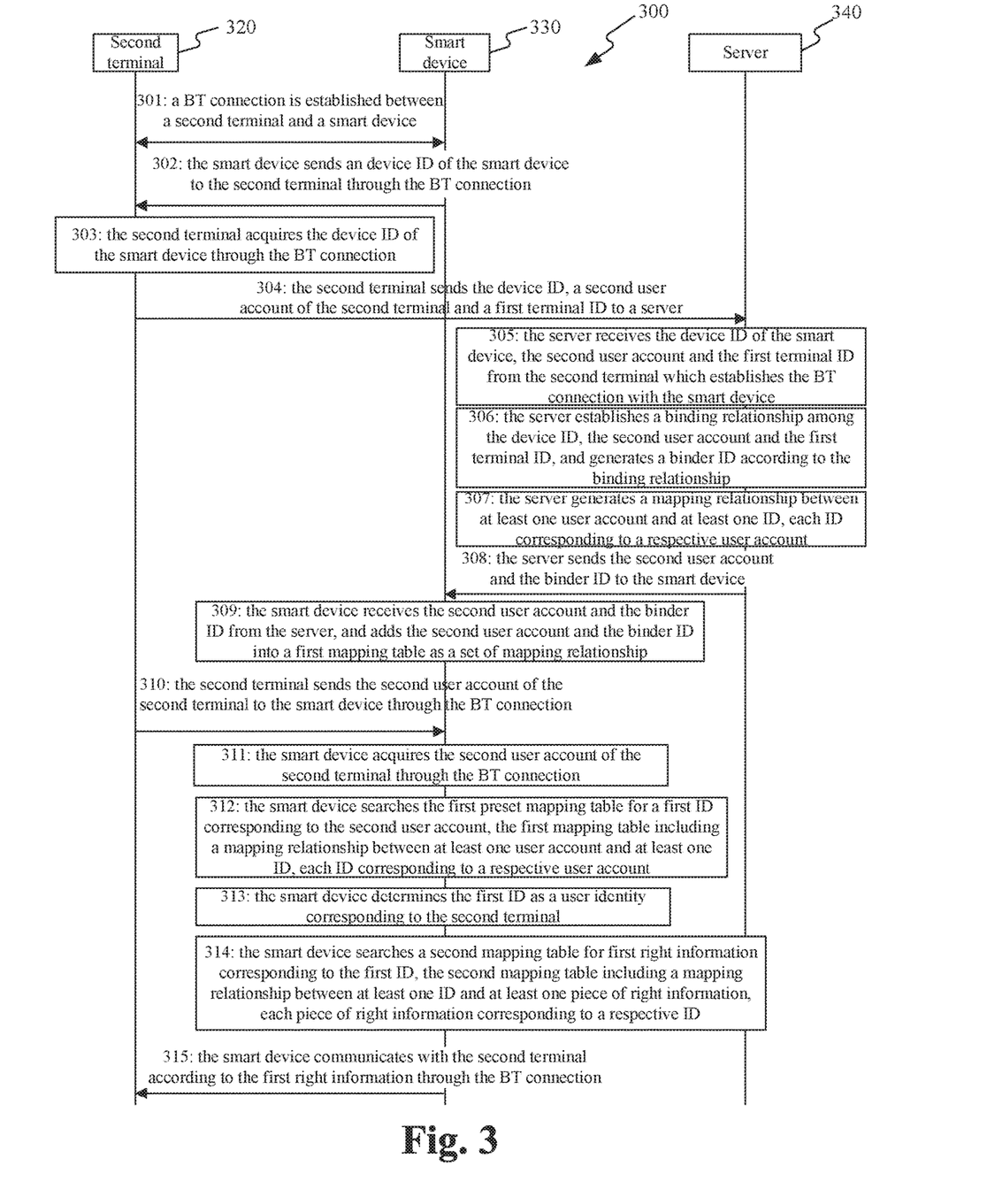
FIG. 3 is a flow chart of a method for BT-based identity recognition, according to another exemplary embodiment.

FIG. 3 is a flow chart of a method 300 for BT-based identity recognition, according to another exemplary embodiment. In the exemplary embodiment in FIG. 3, a binding relationship between a second terminal 320 and a smart device 330 is to be established. The method 300 may include the following steps.

In step 301, a BT connection is established between the second terminal 320 and the smart device 330.

A BT protocol is a wireless technology standard capable of implementing communications between terminals. A connection established between the second terminal and the smart device by virtue of the BT protocol is referred to as a BT connection.

The step 301 includes that: the second terminal actively establishes the connection with the smart device, or the smart device actively establishes the BT connection with the second terminal.

In the exemplary embodiment, since the second terminal is required to establish a binding relationship with the smart device, the second terminal is also required to acquire a device ID of the smart device, that is, step 302 is executed.

In step 302, the smart device 330 sends a device ID of the smart device 330 to the second terminal 320 through the BT connection.

The device ID of the smart device is configured to uniquely identify the smart device. In this exemplary embodiment, after the second terminal establishes the BT connection with the smart device, the smart device may actively send its own device ID to the second terminal. Alternatively, the second terminal may send an ID acquisition request to the smart device, and the smart device sends its own device ID to the second terminal according to the ID acquisition request. There are no limits made to a manner for triggering sending of the device ID in the embodiment.

During practical implementation, after the second terminal establishes the BT connection with the smart device, the second terminal may display device IDs of all smart devices connected with the terminal in a display interface of a preset client, and display binding controls in areas corresponding to the device IDs of unbound smart devices. When the second terminal receives a triggering operation by a user over a binding control, the second terminal executes step 303.

In step 303, the second terminal 320 acquires the device ID of the smart device 330 through the BT connection.

In step 304, the second terminal 320 sends the device ID, a second user account of the second terminal and a first terminal ID to a server 340. The first terminal ID is a terminal ID of the second terminal 320.

The second user account of the second terminal may be an operating system account for login of the user in the second terminal, an application account for login of the user in an application of the second terminal, an account stored in the second terminal, an ID of the second terminal, and the like. The second user account is not limited in the embodiment.

The first terminal ID is configured to uniquely identify a terminal, which may be a media access control (MAC) address and the like. There are no limits in the embodiment.

The second terminal sends the second user account, the acquired device ID of the smart device and the first terminal ID to the server. The server is a server corresponding to the user account. For example, when the user account is a Xiaomi account, the server is a Xiaomi server. Therefore, when receiving the second user account, the server may recognize the second user account and establish a relationship between other information and the second user account.

In some embodiments, the second terminal may also generate a binding request, and adds the device ID, the second user account and the first terminal ID into the binding request for sending to the server.

In step 305, the server 340 receives the device ID of the smart device 330, the second user account and the first terminal ID from the second terminal 320 which establishes the BT connection with the smart device 330.

In step 306, the server 340 establishes a binding relationship among the device ID, the second user account and the first terminal ID, and generates a binder ID according to the binding relationship.

The binder ID is an ID corresponding to the second terminal which establishes the binding relationship with the smart device.

The server establishes the binding relationship among the device ID, the second user account and the first terminal ID. Namely, the server binds the smart device identified by the device ID and the second terminal corresponding to the second user account.

Then, the server is also required to generate an ID according to the relationship between the second terminal and the smart device. Since the relationship between the second terminal and the smart device is the binding relationship in the embodiment, the second terminal is also required to generate the binder ID, and determines the binder ID as the ID corresponding to the second terminal. The server stores the device ID, the second user account, the first terminal ID and the binder ID.

In the illustrated embodiment, the ID may be a character string with a preset bit number, for example, the character string of the binder ID may be 11 or 00 when the preset bit number is 2. There are no limits made in the embodiment.

In step 307, the server 340 generates a mapping relationship between at least one user account and each ID.

After generating the ID of the second terminal, the server is also required to notify the smart device of the ID. At this moment, the server generates the mapping relationship between the ID and the second user account, and sends the mapping relationship to the smart device.

In step 308, the server 340 sends the second user account and the binder ID to the smart device 330.

After the second terminal establishes the binding relationship with the smart device, the ID of the second terminal is the binder ID, and the server sends the second user account and the binder ID to the smart device.

In step 309, the smart device 330 receives the second user account and the binder ID from the server 340, and adds the second user account and the binder ID into a first mapping table as a set of mapping relationship.

The smart device adds the second user account and the binder ID which are sent by the server into the first mapping table as a set of mapping relationship.

In the illustrated embodiment, a process of establishing the binding relationship between the second terminal 320 and the smart device 330 is illustrated in step 301 to step 309. An identity recognition process between the second terminal 320 and the smart device 330 is described below. In the process of recognizing an identity of the second terminal 320, the second terminal 320 is the first terminal in the exemplary embodiment in FIG. 2 and the second user account is the first user account in the exemplary embodiment in FIG. 2. Step 310 is executed when the BT connection is established between the second terminal 320 and the smart device 330. When the BT connection is not established between the second terminal 320 and the smart device 330, it is necessary to establish the BT connection between the second terminal 320 and the smart device 330 before step 310.

In step 310, the second terminal 320 sends the second user account of the second terminal 320 to the smart device 330 through the BT connection.

In this exemplary embodiment, after the second terminal establishes the connection with the smart device, the second terminal sends its own second user account to the smart device.

In step 311, the smart device 330 acquires the second user account of the second terminal 320 through the BT connection.

In step 312: the smart device 330 searches the first preset mapping table for a first ID corresponding to the second user account. The first mapping table includes a mapping relationship between at least one user account and at least one ID. Each ID corresponds to a respective user account.

The first mapping table stores the mapping relationship between the at least one user account and the ID corresponding to each user account. The smart device searches the first mapping table for a user account which is the same as the second user account according to the acquired second user account. The first ID corresponding to the user account that is the same as the second user account in the mapping table is the first ID corresponding to the second user account.

In this exemplary embodiment, since the second terminal establishes the binding relationship with the smart device, the first ID found by the smart device is the binder ID.

In step 313, the smart device 330 determines the first ID as a user identity corresponding to the second terminal 320.

Since the first ID found by the smart device is the binder ID, the user identity is a binder.

In this exemplary embodiment, the smart device provides different access rights for terminals corresponding to different user identities. At this moment, step 314 is executed. That is, the first mapping table includes the mapping relationship between the at least one user account and the ID corresponding to each user account, and may include IDs of at least two different levels. The IDs of different levels correspond to different access right information. The ID levels have a positive correlation relationship with levels of the access rights indicated by the access right information.

In the illustrated embodiment, the ID levels may be related to security of the user identities, that is, a level of an ID is higher if security of a user identity is higher, and the level of the ID is lower if the security of the user identity is lower. The levels of the access rights may be related to the number of functions provided by the smart device, that is, the number of functions provided by the smart device is larger if a level of an access right is higher, and the number of the functions provided by the smart device is smaller if the level of the access right is lower. In such a manner, the smart device provides more functions for a terminal corresponding to a secure user identity, and provides fewer functions for a terminal corresponding to an insecure user identity. As a result, communication security is further ensured.

In step 314, the smart device 330 further searches a second mapping table for first right information corresponding to the first ID. The second mapping table includes a mapping relationship between at least one ID and at least one piece of right information. Each piece of right information corresponds to a respective ID.

The second mapping table includes the mapping relationship between the at least one ID and the right information corresponding to each ID. The right information is configured to indicate an access right over the smart device.

For example, when the first ID is a binder, the corresponding first right information corresponds to all functions provided by the smart device.

In step 315, the smart device 330 communicates with the second terminal 320 according to the first right information through the BT connection.

When the first right information, found from the second mapping table by the smart device and corresponding to the binder ID, corresponds to all the functions provided by the smart device, the second terminal determines that all the functions of the smart device may be called.

For example, the second terminal may be a mobile phone of a user, and the smart device may be a printer in a house of the user. The mobile phone displays the printer connected with the mobile phone on an interface, and displays a "bind" button for binding with the printer after the mobile phone establishes a BT connection with the printer. When the user clicks the "bind" button, the mobile phone acquires a printer ID from the printer, and the printer sends the printer ID to the mobile phone. The mobile phone sends its own user account, a mobile phone ID and the printer ID to a server. The server establishes a binding relationship among the user account, the mobile phone ID and the printer ID, and generates a binder ID corresponding to the mobile phone which establishes the binding relationship with the printer. The server generates a mapping relationship between the binder ID and the user account, and sends the mapping relationship to the printer. The printer adds the user account of the mobile phone and the binder ID into a first preset mapping table. At this point, the mobile phone establishes the binding relationship with the printer.

In a using process, after the mobile phone establishes the BT connection with the printer, the mobile phone sends its own user account to the printer. The printer searches the first preset mapping table for a user account that is the same as the received user account. An ID corresponding to the found user account is the binder ID, and the printer confirms that a user identity of the mobile phone is a binder.

In the method 300 provided by the present disclosure, the second user account of the second terminal is acquired through the BT connection established with the second terminal The first preset mapping table is searched for the first ID corresponding to the second user account. The first preset mapping table includes the mapping relationship between the at least one user account and the ID corresponding to each user account, and the mapping relationship is determined and sent to the smart device by the server. The user identity corresponding to the second terminal is determined according to the first ID. In this way, the smart device communicates with the second terminal after recognizing the user identity of the second terminal, such that the problem of communication insecurity caused by communications between an illegal terminal and the smart device is solved, and the effect of ensuring communication security is achieved.

In addition, the IDs may be divided into the binder IDs or the sharer IDs, such that the user identity of the terminal is expanded.

The IDs of different levels correspond to different right information, and the levels of the IDs have a positive correlation relationship with the levels of the access rights indicated by the right information. As a result, different access rights are provided for terminals corresponding to different user identities. High-level access rights are set for high-level IDs, and low-level access rights are set for low-level IDs. That is, more functions are provided for a terminal corresponding to a secure user identity, and fewer functions are provided for a terminal corresponding to an insecure user identity. Therefore, communication security is further ensured.

In some embodiments, after the second terminal establishes the binding relationship with the smart device, the second terminal may further share the smart device to a third terminal for the third terminal to establish a sharing relationship with the smart device.

Figure 4:
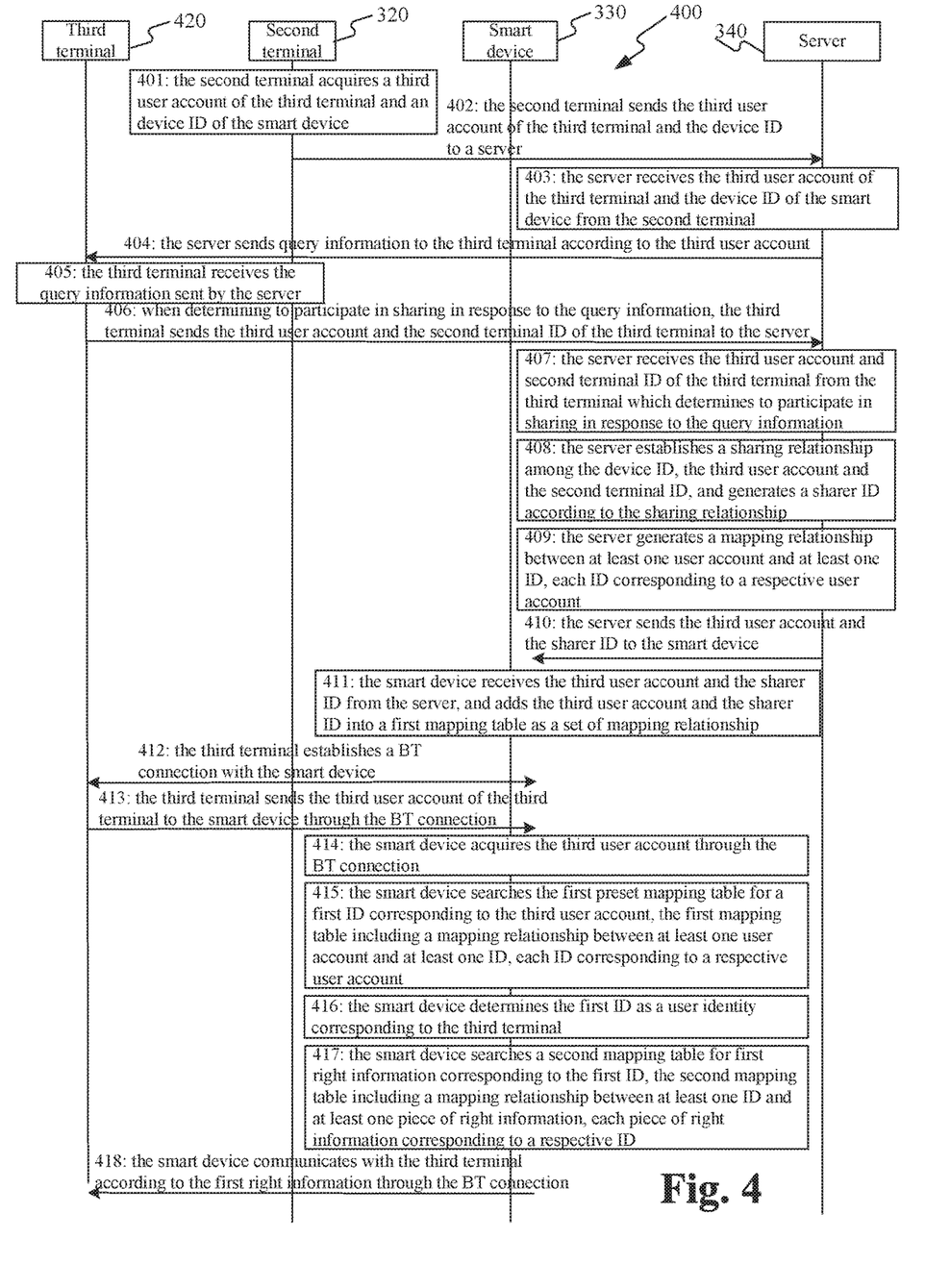
FIG. 4 is a flow chart of a method for BT-based identity recognition, according to yet another exemplary embodiment.

FIG. 4 is a flow chart of a method 400 for BT-based identity recognition, according to yet another exemplary embodiment. In the exemplary embodiment in FIG. 4, a sharing relationship between a third terminal 420 and the smart device 330 is to be established. The method 400 may include the following steps.

In step 401, the second terminal 320 acquires a third user account of the third terminal 420 and the device ID of the smart device 330.

In this exemplary embodiment, the second terminal is a terminal which establishes a binding relationship with the smart device, and the third terminal is a terminal which confirms to participate in sharing after the second terminal shares the smart device to each additional terminal. For example, after the terminal 320 is bound with the smart device 330, the terminal 320 may share the smart device 330 to the terminal 420. The terminal 420 can confirm to participate in sharing.

The third user account of the third terminal may be an operating system account for login of a user in the third terminal, an application account for login of the user in an application of the third terminal, an account stored in the third terminal, an ID of the third terminal, and the like. The third user account is not limited in the embodiment.

During practical implementation, after the second terminal establishes the binding relationship with the smart device, the second terminal displays an interface of sharing the smart device in a display interface of a preset client. When the second terminal receives the third user account, input in an input box of the interface by the user, of the third terminal and a triggering operation of the user over a share control, the second terminal reads the device ID, acquired in a binding relationship establishment process, of the smart device, and then executes step 402.

In step 402, the second terminal 320 sends the third user account of the third terminal 420 and the device ID to the server 340.

The second terminal sends the third user account of the third terminal and the acquired device ID of the smart device to the server. Herein the server is a server corresponding to the third user account. For example, when the third user account is a Xiaomi account, the server is a Xiaomi server. Therefore, when receiving the third user account, the server may recognize the third user account and establish a relationship between other information and the third user account.

In some embodiments, the second terminal may also generate a sharing request, and adds the device ID and the third user account into the sharing request for sending to the server.

In step 403, the server 340 receives the third user account of the third terminal 420 and the device ID of the smart device 330 from the second terminal 320.

In step 404, the server 340 sends query information to the third terminal 420 according to the third user account.

The query information is configured to query about whether the third terminal confirms to participate in sharing. Herein the query information at least includes the device ID of the smart device and a second terminal ID, the second terminal ID being a terminal ID of the third terminal.

In step 405, the third terminal 420 receives the query information sent by the server 340.

In step 406, when determining to participate in the sharing according to the query information, the third terminal 420 sends the third user account and the second terminal ID of the third terminal 420 to the server 340.

The third terminal displays the received query information, and also displays an "OK" control and a "cancel" control. When receiving a triggering operation of the user over the "OK" control, the third terminal determines to participate in the sharing, and sends the third user account and the second terminal ID of the third terminal to the server. When receiving a triggering operation of the user over the "cancel" control, the third terminal determines not to participate in the sharing, and the flow chart ends.

In step 407, the server 340 receives the third user account and the second terminal ID of the third terminal which are sent by the third terminal 420 after determining to participate in the sharing according to the query information.

In step 408, the server 340 establishes a sharing relationship among the device ID, the third user account and the second terminal ID, and generates a sharer ID according to the sharing relationship.

The sharer ID refers to an ID corresponding to the third terminal which establishes the sharing relationship with the smart device.

The server establishes the sharing relationship among the device ID, the third user account and the second terminal ID.

Then, the server is also required to generate an ID according to the relationship between the third terminal and the smart device. Since the relationship between the third terminal and the smart device is the sharing relationship in the embodiment, the server is also required to generate the sharer ID, and determines the sharer ID as the ID corresponding to the third terminal. The server stores the device ID, the second user account, the second terminal ID and the sharer ID.

In step 409, the server 340 generates a mapping relationship between at least one user account and at least one ID. Each ID corresponds to a respective user account. In the embodiment, the ID is the sharer ID.

In step 410, the server 340 sends the third user account and the sharer ID to the smart device 330.

After generating the ID of the third terminal, the server is also required to notify the smart device of the ID. At this moment, the server generates the mapping relationship between the ID and the third user account, and sends the mapping relationship to the smart device.

In step 411, the smart device 330 receives the third user account and the sharer ID from the server 340, and adds the third user account and the sharer ID into the first preset mapping table as a set of mapping relationship.

The first preset mapping table includes the mapping relationship between the at least one user account and the ID corresponding to each user account. The smart device adds the third user account and the sharer ID which are sent by the server into the first preset mapping table.

Herein, a process of establishing the sharing relationship between the third terminal and the smart device is illustrated in step 401 to step 411. An identity recognition process between the third terminal and the smart device is described below. In the process of recognizing an identity of the third terminal, the third terminal corresponds to the first terminal in the embodiment in FIG. 2 and the third user account corresponds to the first user account in the embodiment in FIG. 2.

In step 412, the third terminal 420 establishes a BT connection with the smart device 330.

In step 413, the third terminal 420 sends the third user account of the third terminal to the smart device 330 through the BT connection.

In the embodiment, after the third terminal establishes the BT connection with the smart device, the third terminal sends its own third user account to the smart device.

In step 414: the smart device acquires the third user account through the BT connection.

In step 415, the smart device searches the first preset mapping table for a first ID corresponding to the third user account. The first mapping table includes the mapping relationship between the at least one user account and the at least one ID Each ID corresponds to a respective user account.

In the embodiment, since the third terminal establishes the sharing relationship with the smart device, the first ID found by the smart device is the sharer ID.

In step 416, the smart device 330 determines the first ID as a user identity corresponding to the third terminal 420. Since the found first ID of the third terminal is the sharer ID, the user identity is a sharer.

In this exemplary embodiment, the smart device provides different access rights for terminals corresponding to different user identities. At this moment, step 417 is executed. That is, the first preset mapping table includes the mapping relationship between the at least one user account and the ID corresponding to each user account, and includes IDs of at least two different levels. The IDs of different levels correspond to different right information, and the levels of the IDs have a positive correlation relationship with levels of the access rights indicated by the right information.

Herein, the levels of the IDs are related to security of the user identities. That is, a level of an ID is higher if security of a user identity is higher, and the level of the ID is lower if the security of the user identity is lower. The levels of the access rights are related to the number of functions provided by the smart device. That is, the number of functions provided by the smart device is larger if a level of an access right is higher, and the number of the functions provided by the smart device is smaller if the level of the access right is lower. In such a manner, the smart device provides more functions for a terminal corresponding to a secure user identity, and provides fewer functions for a terminal corresponding to an insecure user identity. As a result, communication security is further ensured.

In step 417, the smart device 330 searches a second mapping table for first right information corresponding to the first ID. The second mapping table includes a mapping relationship between at least one ID and at least one piece of right information. Each piece of right information corresponds to a respective ID.

The second mapping table includes the mapping relationship between the at least one ID and the right information corresponding to each ID. The right information is configured to indicate an access right over the smart device.

For example, when the first ID is a sharer, the corresponding first right information corresponds to part of functions provided by the smart device.

In step 418, the smart device 330 communicates with the third terminal 420 according to the first right information through the BT connection.

When the first right information, obtained from the second mapping table by the smart device and corresponding to the sharer ID, corresponds to part of the functions provided by the smart device, the third terminal determines that part of the functions of the smart device may be called.

For example, the third terminal may be a mobile phone of a family member in a family, and the smart device may be a printer. A mobile phone 1 of a family member 1 establishes a binding relationship with the printer. When the member 1 shares the printer to another family member 2, the member 1 inputs a user account of the member 2 in the mobile phone 1, and sends the user account of the member 2 and a printer ID to the server. The server receives the user account of the member 2 and the printer ID, and sends query information to the mobile phone 2 of the member 2 according to the user account of the member 2. The member 2 sends the user account of the member 2, a mobile phone ID of the mobile phone 2, and the printer ID to the server through the mobile phone 2 when confirming to participate in sharing. The server establishes a sharing relationship among the user account of the member 2, the mobile phone ID of the mobile phone 2 and the printer ID, and generates a sharer ID corresponding to the mobile phone 2. The server generates mapping between the sharer ID and the user account, and sends the mapping to the printer. The printer adds the user account of the member 2 and the sharer ID into a first mapping table. At this point, the mobile phone 2 participating in the sharing establishes the sharing relationship with the printer.

In a using process, after the mobile phone 2 establishes a BT connection with the printer, the mobile phone 2 sends its own user account to the printer. The printer searches the first preset mapping table for a user account that is the same as the received user account. An ID corresponding to the identified user account is the sharer ID. The printer confirms that a user identity of the mobile phone 2 is a sharer.

In some embodiments, when there exists no ID corresponding to the user account of the terminal in the first mapping table, the smart device determines that the user identity of the terminal is a stranger, and an access right corresponding to the ID of the stranger is of the lowest level.

In the methods 200, 300, and 400 provided by the present disclosure, the first user account of the first terminal is acquired through the BT connection established with the first terminal, and the first preset mapping table is searched for the first ID corresponding to the first user account. The first mapping table includes the mapping relationship between the at least one user account and the ID corresponding to each user account. The mapping relationship is determined and sent to the smart device by the server. The user identity corresponding to the first terminal is determined according to the first ID. In this way, the smart device communicates with the terminal after recognizing the user identity of the terminal. As a result, the problem of communication insecurity caused by communication between an illegal terminal and the smart device is solved, and the effect of ensuring communication security is achieved.

The IDs are divided into binder IDs and/or sharer IDs, such that the user identity of the terminal is expanded.

The IDs of different levels correspond to different right information, and the levels of the IDs have the positive correlation relationship with the levels of the access rights indicated by the right information. Thus, different access rights are provided for terminals corresponding to different user identities, for example, high-level access rights are set for high-level IDs, and low-level access rights are set for low-level IDs. Namely, more functions are provided for a terminal corresponding to a secure user identity, and fewer functions are provided for a terminal corresponding to an insecure user identity. Therefore, communication security is further ensured.

Figure 5:
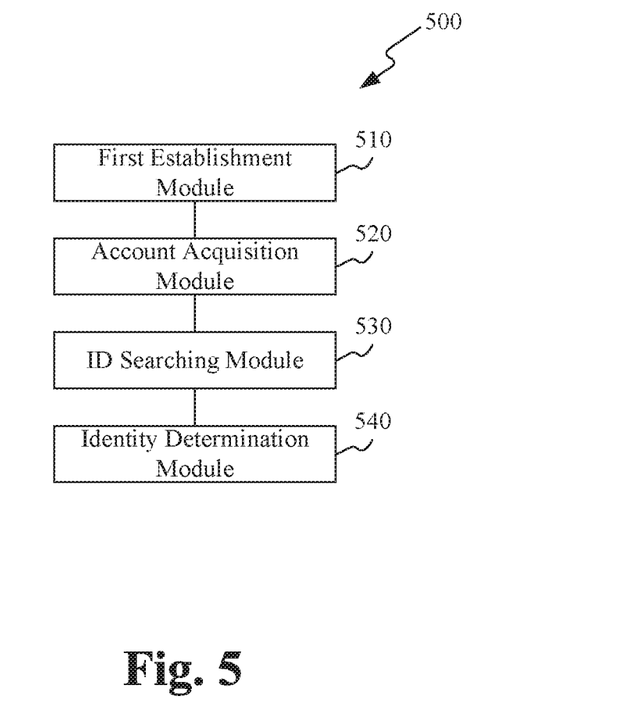
FIG. 5 is a block diagram of an apparatus for BT-based identity recognition, according to an exemplary embodiment.

FIG. 5 is a block diagram of an apparatus 500 for BT-based identity recognition, according to an exemplary embodiment. The apparatus 500 may be applied to a BT-enabled smart device. As shown in FIG. 5, the apparatus 500 may include: a first establishment module 510, an account acquisition module 520, an ID searching module 530 and an identity determination module 540.

The first establishment module 510 may be configured to establish a BT connection with a first terminal. The account acquisition module 520 may be configured to acquire a first user account of the first terminal through the BT connection established by the first establishment module 510. The ID searching module 530 may be configured to search a first preset mapping table for a first ID corresponding to the first user account acquired by the account acquisition module 520. The first preset mapping table may include a mapping relationship between at least one user account and at least one ID. Each ID corresponds to a respective user account, and the mapping relationship may be determined and sent to a smart device by a server. The identity determination module 540 may be configured to determine the first ID identified by the ID searching module 530 as a user identity corresponding to the first terminal.

From the above, according to the apparatus 500 provided by the present disclosure, the first user account of the first terminal is acquired through the BT connection established with the first terminal, and the first preset mapping table is searched for the first ID corresponding to the first user account. The first mapping table includes the mapping relationship between the at least one user account and the ID corresponding to each user account, and the mapping relationship is determined and sent to the smart device by the server. The user identity corresponding to the first terminal is determined according to the first ID. In this way, the smart device communicates with the terminal after recognizing the user identity of the terminal. As a result, the problem of communication insecurity caused by communication between an illegal terminal and the smart device is solved, and the effect of ensuring communication security is achieved.

Figure 6:
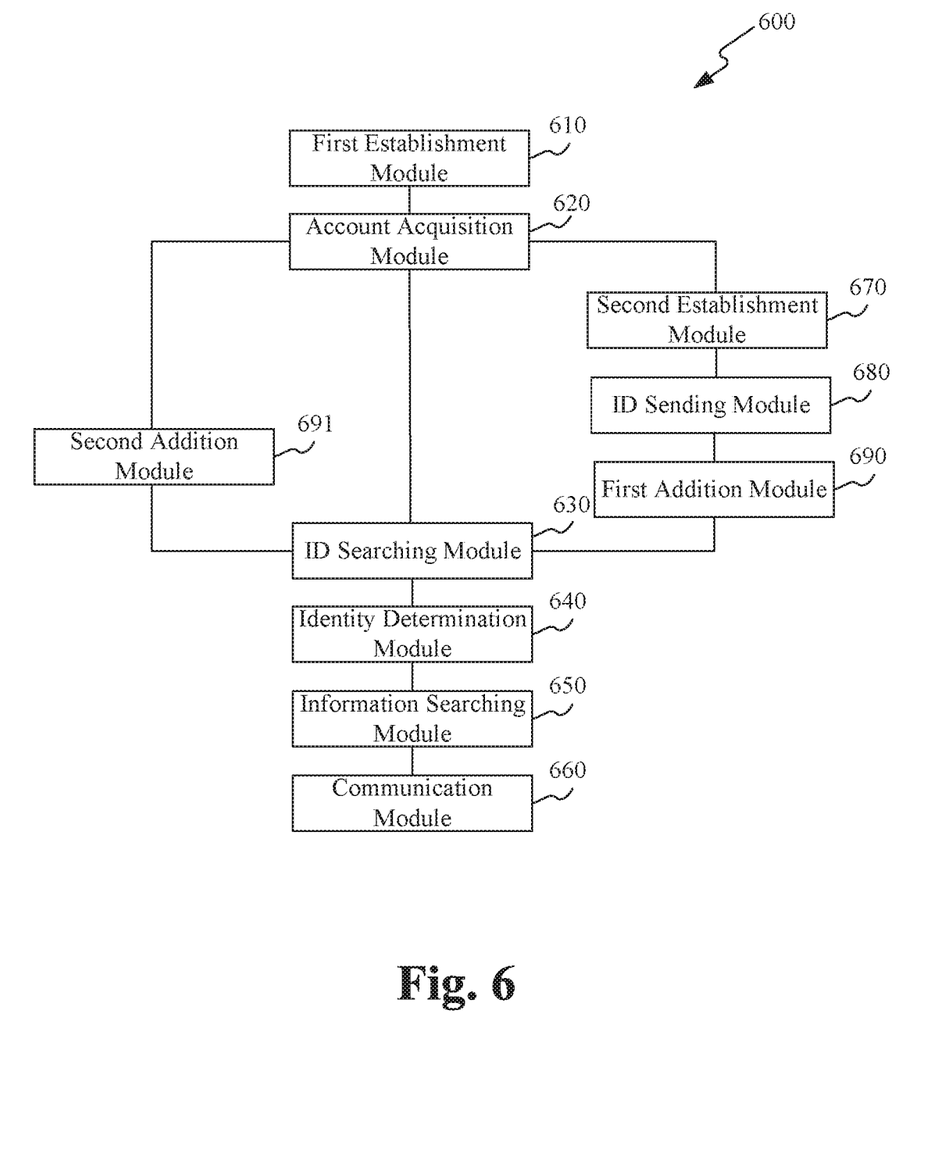
FIG. 6 is a block diagram of an apparatus for BT-based identity recognition, according to another exemplary embodiment.

FIG. 6 is a block diagram of an apparatus 600 for BT-based identity recognition, according to another exemplary embodiment. The apparatus 600 may be applied to a BT-enabled smart device. As shown in FIG. 6, the apparatus 600 may include a first establishment module 610, an account acquisition module 620, an ID searching module 630 and an identity determination module 640.

The first establishment module 610 may be configured to establish a BT connection with a first terminal.

The account acquisition module 620 may be configured to acquire a first user account of the first terminal through the BT connection established by the first establishment module 610.

The ID searching module 630 may be configured to search a first preset mapping table for a first ID corresponding to the first user account acquired by the account acquisition module 620. The first preset mapping table may include a first mapping relationship between at least one user account and at least one ID. Each ID corresponds to a respective user account, and the first mapping relationship may be determined and sent to a smart device by a server.

The identity determination module 640 may be configured to determine the first ID found by the ID searching module 630 as a user identity corresponding to the first terminal.

In some embodiments, the first preset mapping table may include IDs of at least two different levels. The IDs of different levels correspond to different right information, and the levels of the IDs have a positive correlation relationship with levels of access rights indicated by the right information.

In some embodiments, the IDs are binder IDs or sharer IDs. The binder IDs are IDs corresponding to terminals which establish a binding relationship with the smart device, and the sharer IDs are IDs corresponding to terminals which establish a sharing relationship with the smart device.

In some embodiments, the apparatus 600 may further include an information searching module 650 and a communication module 660.

The information searching module 650 may be configured to search a second mapping table for first right information corresponding to the first ID. The second mapping table may include a second mapping relationship between at least one ID and at least one piece of right information. Each piece of right information corresponds to a respective ID.

The communication module 660 may be configured to communicate with the first terminal through the BT connection according to the first right information found by the information searching module 650.

In some embodiments, the apparatus 600 may further includes a second establishment module 670, an ID sending module 680 and a first addition module 690.

The second establishment module 670 may be configured to establish a second BT connection with a second terminal.

The ID sending module 680 may be configured to send a device ID of the smart device to the second terminal through the second BT connection, such that the second terminal sends the device ID, a second user account of the second terminal and a first terminal ID to the server. The server may establish a binding relationship among the device ID, the second user account and the first terminal ID and to generate a binder ID according to the binding relationship.

The first addition module 690 may be configured to receive the second user account and the binder ID from the server, and to add the second user account and the binder ID into the first preset mapping table as a set of mapping relationship.

In some embodiments, the apparatus 600 may further include a second addition module 691.

The second addition module 691 may be configured to receive a third user account of a third terminal and a sharer ID from the server, and to add the third user account and the sharer ID into the first mapping table as a set of mapping relationship. The sharer ID may be generated by the server according to a sharing relationship among the device ID, the third user account and a second terminal ID. Herein the server receives the third user account of the third terminal and the device ID from the second terminal which establishes the binding relationship with the smart device, sends query information to the third terminal according to the third user account, receives the third user account and the second terminal ID from the third terminal which determines to participate in sharing according to the query information, and establishes the sharing relationship among the device ID, the third user account and the second terminal ID.

From the above, according to the apparatus 600 provided by the present disclosure, the first user account of the first terminal is acquired through the BT connection established with the first terminal, and the first preset mapping table is searched for the first ID corresponding to the first user account. The first mapping table includes the first mapping relationship between the at least one user account and the ID corresponding to each user account. The first mapping relationship is determined and sent to the smart device by the server. The user identity corresponding to the first terminal is determined according to the first ID. In this way, the smart device communicates with the terminal after recognizing the user identity of the terminal. As a result, the problem of communication insecurity caused by communication between an illegal terminal and the smart device is solved, and the effect of ensuring communication security is achieved.

The IDs are divided into the binder IDs or the sharer IDs, such that the user identity of the terminal is expanded.

The IDs of different levels correspond to different right information, and the levels of the IDs have the positive correlation relationship with the levels of the access rights indicated by the right information. Different access rights are provided for terminals corresponding to different user identities, for example, high-level access rights are set for high-level IDs, and low-level access rights are set for low-level IDs. That is, more functions are provided for a terminal corresponding to a secure user identity, and fewer functions are provided for a terminal corresponding to an insecure user identity; and therefore, communication security is further ensured.

An exemplary embodiment of the present disclosure provides a BT-based identity recognition apparatus, which may implement a BT-based identity recognition method provided by the present disclosure and is applied to BT-enabled smart device. The BT-based identity recognition apparatus may include a processor and a memory configured to store instructions executable by the processor.

The processor may be configured to establish a BT connection with a first terminal, acquire a first user account of the first terminal through the BT connection, search a first preset mapping table for a first ID corresponding to the first user account, and determine a user identity corresponding to the first terminal according to the first ID. The first mapping table includes a mapping relationship between at least one user account and at least one ID. Each ID corresponds to a respective user account, and the mapping relationship is determined and sent to the smart device by a server.

Figure 7:
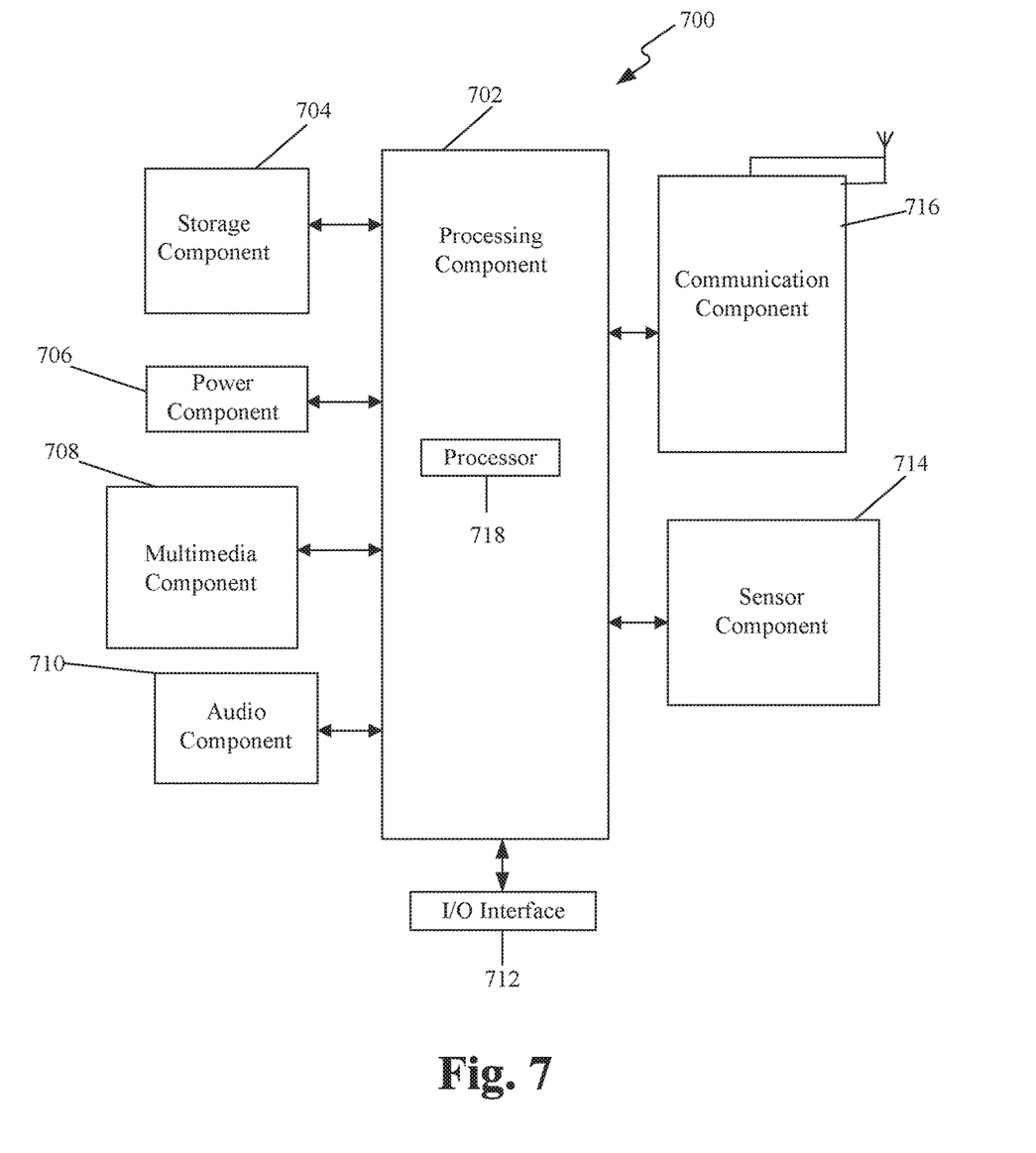
FIG. 7 is a block diagram of an apparatus for BT-based identity recognition, according to yet another exemplary embodiment.

FIG. 7 is a block diagram of a BT-based identity recognition apparatus 700, according to an exemplary embodiment. For example, the apparatus 700 may be the above described smart device or any of the above described terminals, such as a mobile phone, a computer, a digital broadcast terminal, a messaging device, a gaming console, a tablet, a medical device, an exercise device, a personal digital assistant, and/or the like.

Referring to FIG. 7, the apparatus 700 may include one or more of the following components: a processing component 702, a storage component 704, a power component 706, a multimedia component 708, an audio component 710, an input/output (I/O) interface 712, a sensor component 714, and a communication component 716.

The processing component 702 may control overall operations of the apparatus 700, such as the operations associated with display, telephone calls, data communications, camera operations, and recording operations. The processing component 702 may include one or more processors 718 to execute instructions to perform all or part of the steps in the abovementioned methods. Moreover, the processing component 702 may include one or more modules which facilitate interactions between the processing component 702 and the other components. For instance, the processing component 702 may include a multimedia module to facilitate interactions between the multimedia component 708 and the processing component 702.

The storage component 704 may be configured to store various types of data to support operations of the apparatus 700. Examples of such data may include instructions for any application programs or methods operated on the apparatus 700, contact data, phonebook data, messages, pictures, video, etc. The storage component 704 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and/or a magnetic or optical disk.

The power component 706 may provide power for various components of the apparatus 700. The power component 706 may include a power management system, one or more power supplies, and other components associated with the generation, management and distribution of power for the apparatus 700.

The multimedia component 708 may include a screen providing an output interface between the apparatus 700 and a user. In some embodiments, the screen may include a liquid crystal display (LCD) and a touch panel (TP). If the screen includes the TP, the screen may be implemented as a touch screen to receive an input signal from the user. The TP may include one or more touch sensors to sense touches, swipes and gestures on the TP. The touch sensors may not only sense a boundary of a touch or swipe action, but also sense a time duration and pressure associated with the touch or swipe action. In some embodiments, the multimedia component 708 may include a front camera and/or a rear camera. The front camera and/or the rear camera may receive external multimedia data when the apparatus 700 is in an operation mode, such as a photographing mode or a video mode. The front camera and/or the rear camera may be a fixed optical lens system or have focusing and optical zooming capabilities.

The audio component 710 may be configured to output and/or input an audio signal. For example, the audio component 710 may include a Microphone (MIC). The MIC may be configured to receive an external audio signal when the apparatus 700 is in the operation mode, such as a call mode, a recording mode and/or a voice recognition mode. The received audio signal may be further stored in the storage component 704 or sent through the communication component 716. In some embodiments, the audio component 710 may further include a speaker configured to output the audio signal.

The I/O interface 712 may provide an interface between the processing component 702 and a peripheral interface module. The peripheral interface module may be a keyboard, a click wheel, a button and/or the like. The button may include, but are not limited to, a home button, a volume button, a starting button and/or a locking button.

The sensor component 714 may include one or more sensors configured to provide status assessment in various aspects for the apparatus 700. For instance, the sensor component 714 may detect an on/off status of the apparatus 700 and relative positioning of components, such as a display and small keyboard of the apparatus 700. The sensor component 714 may further detect a change in a position of the apparatus 700 or a component of the apparatus 700, presence or absence of contact between the user and the apparatus 700, orientation or acceleration/deceleration of the apparatus 700 and/or a change in temperature of the apparatus 700. The sensor component 714 may include a proximity sensor configured to detect presence of an object nearby without any physical contact. The sensor component 714 may also include a light sensor, such as a complementary metal oxide semiconductor (CMOS) or charge coupled device (CCD) image sensor configured for an imaging application. In some embodiments, the sensor component 714 may also include an acceleration sensor, a gyroscope sensor, a magnetic sensor, a pressure sensor or a temperature sensor.

The communication component 716 may be configured to facilitate wired or wireless communications between the apparatus 700 and another device. The apparatus 700 may access a BT-technology-based wireless network, or a wireless network based on another communication standard, such as Wi-Fi, 2nd-Generation (2G), 3rd-Generation (3G) or a combination thereof. In an exemplary embodiment, the communication component 716 receives a broadcast signal from an external broadcast management system or broadcast associated information through a broadcast channel. In an exemplary embodiment, the communication component 716 may further include a near field communication (NFC) module to facilitate short-range communications. For example, the NFC module may be implemented on the basis of a radio frequency identification (RFID) technology, an infrared data association (IrDA) technology, an Ultra-Wide-Band (UWB) technology and/or another technology.

In an exemplary embodiment, the apparatus 700 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus 700 may be configured to execute the abovementioned methods.

In an exemplary embodiment, a non-transitory computer-readable storage medium having instructions stored thereon is provided. The instructions may be executed by the processor 718 of the apparatus 700 to implement the abovementioned methods. The non-transitory computer-readable storage medium may be, for example a ROM, a random access memory (RAM), a compact disc read-only memory (CD-ROM), a magnetic tape, a floppy disc, an optical data storage device and/or the like.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for a smart device to perform Bluetooth (BT)-based identity recognition, comprising:
   receiving a binder identifier (ID) and a first user account corresponding to a first terminal from a server;
   adding the first user account and the binder ID into a first preset mapping table as a set of mapping relationship, the first preset mapping table comprising a mapping relationship between at least one user account and at least one binder ID, each binder ID corresponding to a respective user account;
   receiving a sharer ID and a second user account corresponding to a second terminal from the server, a level of an access right to the smart device corresponding to the sharer ID is lower than a level of an access right to the smart device corresponding to the binder ID;
   adding the second user account and the sharer ID into the first preset mapping table as a set of mapping relationship, the first preset mapping table comprising a mapping relationship between at least one user account and at least one sharer ID, each sharer ID corresponding to a respective user account;
   establishing a BT connection with the second terminal;
   acquiring the second user account of the second terminal through the BT connection;
   searching the first preset mapping table for the sharer ID corresponding to the second user account, the first mapping relationship being determined and sent to the smart device by the server; and
   determining a user identity corresponding to the second terminal according to the sharer ID.

2. The method according to claim 1, wherein the first preset mapping table comprises IDs of at least two different levels, the IDs of the at least two different levels corresponding to different right information, and the at least two different levels having a positive correlation relationship with levels of access rights indicated by the different right information.

3. The method according to claim 2, wherein the IDs are binder IDs or sharer IDs, the binder IDs being IDs corresponding to terminals which establish a binding relationship with the smart device, and the sharer IDs being IDs corresponding to terminals which establish a sharing relationship with the smart device.

4. The method according to claim 2, further comprising:
   searching a second mapping table for first right information corresponding to the binder ID or the sharer ID, the second mapping table comprising a second mapping relationship between at least one ID and at least one piece of right information, each piece of right information corresponding to a respective ID; and
   communicating with the first terminal through the BT connection according to the first right information.

5. The method according to claim 1, wherein the BT connection is a first BT connection, and the method further comprises:
   establishing a second BT connection with the first terminal;
   sending a device ID of the smart device to the first terminal through the second BT connection, to enable the first terminal to send the device ID, the first user account of the first terminal, and the first terminal ID to the server, the first terminal ID being a terminal ID of the first terminal, and to enable the server to establish a binding relationship among the device ID, the first user account, and the first terminal ID and to generate the binder ID according to the binding relationship.

6. The method according to claim 5,
   wherein the sharer ID is generated by the server according to a sharing relationship among the device ID, the second user account, and the second terminal ID, the second terminal ID being a terminal ID of the second terminal; and
   the server receives the second user account of the second terminal and the device ID from the first terminal which establishes the binding relationship with the smart device, sends query information to the second terminal according to the second user account, receives the second user account and the second terminal ID from the second terminal which determines to participate in sharing in response to the query information, and establishes the sharing relationship among the device ID, the second user account, and the second terminal ID.

7. A Bluetooth (BT)-based identity recognition apparatus for use in a smart device, comprising:
   a processor; and
   a memory configured to store instructions executable by the processor,
   wherein the processor is configured to:
   receive a binder identifier (ID) and a first user account corresponding to a first terminal from a server;
   add the first user account and the binder ID into a first preset mapping table as a set of mapping relationship, the first preset mapping table comprising a mapping relationship between at least one user account and at least one binder ID, each binder ID corresponding to a respective user account;
   receive a sharer ID and a second user account corresponding to a second terminal from the server, a level of an access right to the smart device corresponding to the sharer ID is lower than a level of access right to the smart device corresponding to the binder ID;
   add the second user account and the sharer ID into the first preset mapping table as a set of mapping relationship, the first preset mapping table comprising a mapping relationship between at least one user account and at least one sharer ID, each sharer ID corresponding to a respective user account;
   establish a BT connection with the second terminal;
   acquire the second user account of the second terminal through the BT connection;
   search the first preset mapping table for the sharer ID corresponding to the second user account, the first mapping relationship being determined and sent to the smart device by the server; and
   determine a user identity corresponding to the second terminal according to the sharer ID.

8. The BT-based identity recognition apparatus according to claim 7, wherein the first preset mapping table comprises IDs of at least two different levels, the IDs of the at least two different levels corresponding to different right information, and the at least two different levels of the IDs having a positive correlation relationship with levels of access rights indicated by the right information.

9. The BT-based identity recognition apparatus according to claim 8, wherein the IDs are binder IDs or sharer IDs, the binder IDs being IDs corresponding to terminals which establish a binding relationship with the smart device, and the sharer IDs being IDs corresponding to terminals which establish a sharing relationship with the smart device.

10. The BT-based identity recognition apparatus according to claim 8, wherein the processor is further configured to:
search a second mapping table for first right information corresponding to the binder ID or the sharer IDS, the second mapping table comprising a second mapping relationship between at least one ID and at least one piece of right information, each piece of right information corresponding to a respective ID; and
communicate with the first terminal through the BT connection according to the first right information.

11. The BT-based identity recognition apparatus according to claim 7, wherein the BT connection is a first BT connection, and the processor is further configured to:
establish a second BT connection with the first terminal;
send a device ID of the smart device to the first terminal through the second BT connection, to enable the first terminal to send the device ID, the first user account of the first terminal, and the first terminal ID to the server, the first terminal ID being a terminal ID of the first terminal, and to enable the server to establish a binding relationship among the device ID, the first user account, and the first terminal ID and to generate the binder ID according to the binding relationship.

12. The BT-based identity recognition apparatus according to claim 11,
wherein the sharer ID is generated by the server according to a sharing relationship among the device ID, the second user account, and the second terminal ID, the second terminal ID being a terminal ID of the second terminal; and
the server receives the second user account of the second terminal and the device ID from the first terminal which establishes the binding relationship with the smart device, sends query information to the second terminal according to the second user account, receives the second user account and the second terminal ID from the second terminal which determines to participate in sharing in response to the query information, and establishes the sharing relationship among the device ID, the second user account, and the second terminal ID.

13. A method for a server to perform Bluetooth (BT)-based identity recognition, comprising:
establishing a binding relationship among a device ID of a smart device, a first user account of a first terminal and a first terminal ID based on the device ID, the first user account and the first terminal ID being sent from the first terminal which establishes a BT connection with the smart device;
generating a binder ID according to the binding relationship;
receiving a second user account of a second terminal and the device ID from the first terminal;
sending query information to the second terminal according to the second user account;
receiving the second user account and a second terminal ID of the second terminal from the second terminal, wherein the second terminal ID indicates that the second terminal determines to participate in the sharing according to the query information;
establishing a sharing relationship among the device ID, the second user account and the second terminal ID based on the second user account and the second terminal ID of the second terminal;
generating a sharer ID according to the sharing relationship;
generating a mapping relationship between at least one user account and at least one ID, each ID corresponding to a respective user account; and
sending the second user account and the sharer ID to the smart device.

14. The method according to claim 13, wherein the first preset mapping table comprises IDs of at least two different levels, the IDs of the at least different levels corresponding to different right information, and the at least two different levels of the IDs having a positive correlation relationship with levels of access rights indicated by the right information.

15. The method according to claim 14, wherein the IDs are binder IDs or sharer IDs, the binder IDs being IDs corresponding to terminals which establish the binding relationship with the smart device, and the sharer IDs being IDs corresponding to terminals which establish the sharing relationship with the smart device.

16. The method according to claim 14, wherein the method further comprises:
searching a second mapping table for first right information corresponding to the binder ID or the sharer ID, the second mapping table comprising a second mapping relationship between at least one ID and at least one piece of right information, each piece of right information corresponding to a respective ID; and
communicating with the first terminal through the BT connection according to the first right information.

17. The method according to claim 13, further comprises:
receiving the device ID, the first user account of the first terminal, and the first terminal ID sent from the first terminal, the first terminal ID being a terminal ID of the first terminal;
sending the first user account and the binder ID to the smart device.

* * * * *